(12) United States Patent
de Cesare et al.

(10) Patent No.: US 8,150,039 B2
(45) Date of Patent: Apr. 3, 2012

(54) SINGLE SECURITY MODEL IN BOOTING A COMPUTING DEVICE

(75) Inventors: Joshua de Cesare, Campbell, CA (US); Dallas Blake De Atley, San Francisco, CA (US); Jonathan Jay Andrews, Mountain View, CA (US); Michael John Smith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1023 days.

(21) Appl. No.: 12/103,685

(22) Filed: Apr. 15, 2008

(65) Prior Publication Data

US 2009/0257595 A1    Oct. 15, 2009

(51) Int. Cl.
*H04L 9/00* (2006.01)

(52) U.S. Cl. ........ 380/277; 380/278; 380/279; 380/280; 713/170; 713/171; 726/1; 726/22; 726/26

(58) Field of Classification Search .......... 713/26, 713/170, 176, 171; 715/771, 772; 380/277–280, 380/259–266; 726/1–26
See application file for complete search history.

(56) References Cited

U.S. PATENT DOCUMENTS

| | | | | |
|---|---|---|---|---|
| 5,991,399 A * | 11/1999 | Graunke et al. | ............... | 380/279 |
| 6,370,249 B1 * | 4/2002 | Van Oorschot | ............... | 380/277 |
| 6,620,047 B1 * | 9/2003 | Alcorn et al. | ................... | 463/37 |
| 7,010,691 B2 * | 3/2006 | Wheeler et al. | ............... | 713/170 |
| 7,080,037 B2 * | 7/2006 | Burger et al. | .................. | 705/50 |
| 7,500,272 B2 * | 3/2009 | Wheeler et al. | ................. | 726/34 |
| 7,805,614 B2 * | 9/2010 | Aull et al. | ..................... | 713/186 |
| 2004/0107349 A1 * | 6/2004 | Sasselli et al. | ................ | 713/176 |
| 2006/0137015 A1 * | 6/2006 | Fahrny et al. | .................... | 726/26 |
| 2007/0253553 A1 * | 11/2007 | Abdul Rahman | ............ | 380/259 |
| 2007/0277037 A1 * | 11/2007 | Langer | ......................... | 713/176 |
| 2008/0170694 A1 * | 7/2008 | Ryan et al. | ..................... | 380/277 |
| 2009/0290712 A1 * | 11/2009 | Henry et al. | ................... | 380/277 |
| 2010/0293490 A1 * | 11/2010 | Rousso et al. | ................ | 715/771 |
| 2011/0004840 A1 * | 1/2011 | Feinberg et al. | ............. | 715/772 |

* cited by examiner

*Primary Examiner* — Thu Ha Nguyen
(74) *Attorney, Agent, or Firm* — Blakely, Sokoloff, Taylor & Zafman LLP

(57) ABSTRACT

A method and apparatus for securely booting software components in an electronic device to establish an operating environment are described herein. According to an aspect of the invention, software components are to be executed in sequence in order to establish an operating environment of a device. For each software component, a security code is executed to authenticate and verify an executable code image associated with each software component using one or more keys embedded within a secure ROM (read-only memory) of the device and one or more hardware configuration settings of the device. The security code for each software component includes a common functionality to authenticate and verify the executable code image associated with each software component. In response to successfully authenticating and verifying the executable code image, the executable code image is then executed in a main memory of the device to launch the associated software component.

25 Claims, 11 Drawing Sheets

SINGLE SECURITY MODEL IN BOOTING A COMPUTING DEVICE

FIELD OF INVENTION

The present invention relates generally to electronic security. More particularly, this invention relates to booting a computing device securely.

BACKGROUND

As more and more computing devices are being used in people's daily life, security has become a widespread concern for users and content providers. Viruses, worms, Trojan horses, identity theft, software and media content piracy, and extortion using threats of data destruction are rampant. Usually, these attacks involve installing and executing malicious software codes to expose access to device resources that would otherwise be private to the system, the content provider, the user or an application.

For example, a hacker program when running in consumer computing devices developed to play audio/video content, such as Hollywood movies or music, could potentially allow the cracking of the encryption used to secure the A/V content. Therefore, high levels of security are usually required for such devices.

An operating system may provide some security features to guard against such attacks. However, the security features of an operating system often fail to keep up with new attacks occurring on a daily basis. Moreover, when booting a computing device, security features may not yet be initialized and are vulnerable to bypass and/or tampering. Another way to guard against these attacks is to completely seal a computing device from installing and/or running any additional software after shipped out from manufacturers. Such a strict measure, however, severely limits the capabilities and the flexibilities of the underlying computing device. Not only does it make upgrading a computing device costly and difficult, it is not able to take advantage of increasing number of applications which do require downloading and running software codes from outside the device. In addition, the rapid technology advancement usually renders the applications or functionalities originally built inside a computing device obsolete within a very short period of time.

Therefore, current security measures do not deliver a robust solution to protect applications and content inside a computing device, while at the same time providing the flexibility to update the software and or firmware for the device.

SUMMARY OF THE DESCRIPTION

A method and apparatus for securely booting software components in an electronic device to establish an operating environment are described herein. According to an aspect of the invention, software components are to be executed in sequence in order to establish an operating environment of a device. For each software component, a security code is executed to authenticate and verify an executable code image associated with each software component using one or more keys embedded within a secure ROM (read-only memory) of the device and one or more configuration settings of the device which may be hardware, software, or a combination of both. The security code for each software component includes at least one common functionality to authenticate and verify the executable code image associated with each software component. In response to successfully authenticating and verifying the executable code image, the executable code image is then executed in a main memory of the device to launch the associated software component.

According to another aspect of the invention, an executable code image representing a software component is to be installed in an electronic device, where the software component is used to establish an operating environment of the electronic device. A signature generation process, such as a hash operation, is performed on at least a portion of the executable code image to generate a signature for the executable code image. The signature is then signed using a certificate of a certificate chain derived from a root certificate that matches a fingerprint embedded within a secure ROM (read-only memory) of the electronic device, where the fingerprint may include identities uniquely identify the electronic device or an entity associated with the electronic device (e.g. manufacturer, distributor, or retailer etc.) The signature, the certificate chain, and the executable code image are then embedded into an object signed by a leaf certificate of the certificate chain. The object is to be stored in a storage within the electronic device, such that the object can be subsequently authenticated and verified using the certificate chain before being loaded in order to establish an operating environment of the electronic device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
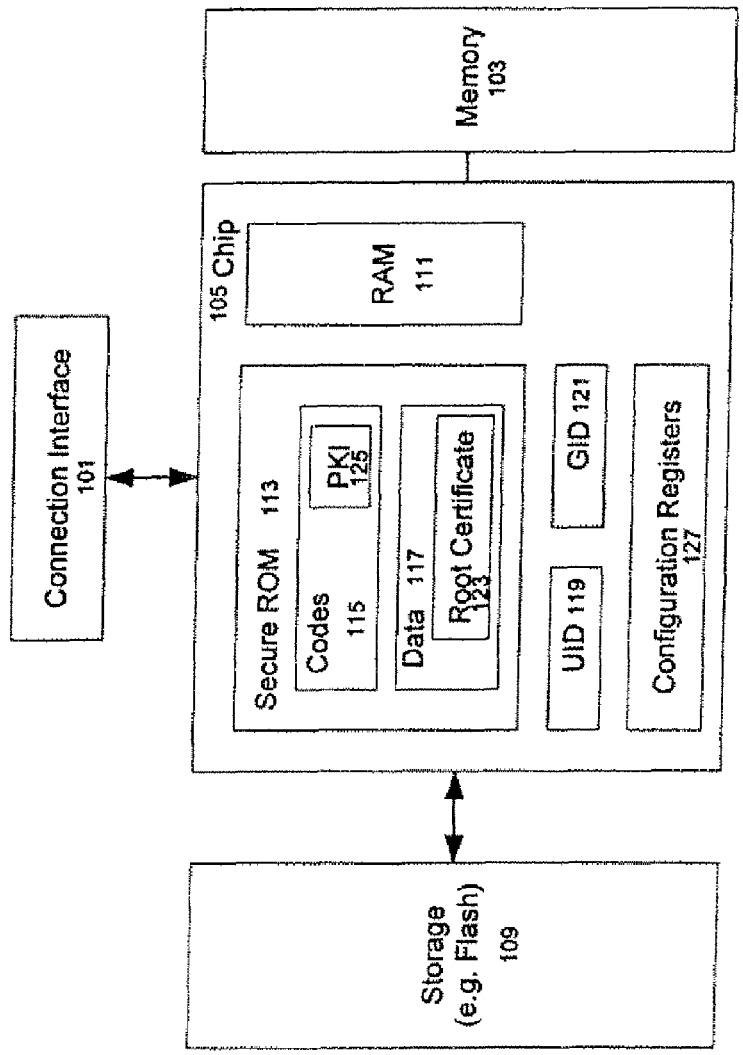
FIG. 1 is a block diagram illustrating one embodiment of system components for secure booting.

A method and an apparatus for verifying a code image for a device based on one or more keys stored within a ROM and one or more hardwired settings are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

In one embodiment, a mechanism for secure booting a device may be designed to ensure critical resources within the device are protected in an operating environment based on a single security architecture. In addition, such a mechanism may provide a flexibility to allow software running inside the device to be updated and installed under different policies and procedures according to certain configurations of a device (e.g. hardware or software settings). Secure booting a device may be performed according to the code (e.g. security utility) and data stored inside a secure storage area such as a ROM (Read Only Memory), also referred to as a secure ROM, integrated within the device.

In one embodiment, a secure ROM is associated with one or more security keys which uniquely represent certain characteristics of a device. The content of a secure ROM may be stored during a manufacturing stage of the device. In one embodiment, a single security model associated with a secure ROM ensures that each executable code for each device is signed by a single central authority. In one embodiment, more than one executable codes may be executed during secure booting of a device. Each of the executable codes for secure booting may include common security instructions implementing a single security model to verify a separate executable code to be executed during securing booting.

In another embodiment, an executable code which has been successfully verified by one device according to a security model may not be verified or trusted in a different device according to the same security model. Thus, a code image certified from a central trust authority may be tied into a device, i.e. a personalized code image, when loaded with the code image. Image personalization is to perform a reversible transformation on an image or a code image that can only be reversed on the very device that performed the original transformation. It is not necessary to perform an encryption on the whole code image to perform the image personalization. For example, encrypting a signed hash associated with the code image with a key derived from a unique identifier embedded inside a device may be sufficient to "foul" the signing such that no other device can consider the code image (or an object including the code image) valid.

According to one embodiment, a certified executable code for a device may include a trusted certificate embedding software information specifying compatibility or operating environment requirements in view of hardware configurations associated with a device. Different devices may include common codes implementing a single security model based on a security policy configured at the manufacturing stage. Thus, embedded tags within a trusted certificate make it possible to enforce device separation to provide flexibility, controllability and alterability for a certified executable code without requiring manufacturing to change settings on a device.

FIG. 1 is a block diagram illustrating one embodiment of system components for secure booting. System 100 may include one or more chips inside a device. In one embodiment, system 100 may include a chip 105 coupled with a memory component 103. Chip 105 may be implemented as a system-on-chip (SOC) configuration. Chip 105 may also include a RAM (Random Access Memory) component 111, such as an SRAM (Static Random Access Memory) or an EDRAM (Embedded Dynamic Random Access Memory). A code image may be loaded into the memory component 103 prior to being executed by the device. When executed, a code image enables a user application, a system application, and/or an operating environment (e.g. operating system) for the device that supports the user or system application. In one embodiment, memory component 103 includes DDR (Double Data Rate) memory. Chip 105 may include a ROM 113 storing codes 115 and associated data 117.

When system 100 is powered up, codes 115 may perform hardware initialization for the device, such as, for example, setting up hardware signals and configurations. A hardware configuration for the device may be obtained from configuration registers 127. A configuration register may be associated with a value hardwired to the device via, for example, burning a fuse of the device. In one embodiment, configuration registers 127 include certain information uniquely identifying certain characteristics of the device, such as, for example, unique identifier, whether the device should be operating in a production mode or a development mode, a minimum version (also referred to as an epoch) with which a software component is allowed to run within the device, etc. In one embodiment, codes 115 determine whether the device is in a recovery mode, for example, caused by a booting failure (e.g. failure to authenticate/verify certain components), in which case, software components may be reloaded or downloaded from a trusted source. For example when the device has been hacked by replacing certain software components of the device, the booting process may detect such a situation using techniques set forth further below. As a result, the device may be forced into a recovery mode in which a trusted host is contacted to download or upgrade further software components that are trusted in order to recover the normal and secure environment of the device.

Codes 115 may include instructions to change the clock rate of the device. PKI codes 125 in codes 115 may implement public key infrastructure (PKI) to certify whether a code image is trusted. For example, PKI codes 125 may include implementations of SHA (Secure Hashing Algorithm) hashing functions such as cryptographic hash functions SHA-1, SHA-224, SHA-256, SHA-384, and SHA-512. Additionally, PKI codes 125 may include implementations of data encrypting algorithms such as AES (Advanced Encryption Standard) encryption. In one embodiment, codes 115 may cause hardware initialization for the device to support a connection or communication interface 101 such as USB (Universal Serial Bus) or serial interface. Note that throughout this application, public key infrastructure, SHA and AES, etc. are utilized as examples for the illustration purposes only; it will be appreciated that other hashing, encryption and/or certification techniques may also be utilized.

In one embodiment, codes 115 cause loading a code image into a device memory such as memory component 103 or RAM 111. A code image may be loaded from a storage component 109 coupled with the chip 105. One or more binary images may be included in a code image executable for booting a device. The storage component 109 may be a flash memory, such as a NAND flash, a NOR flash, or other mass storage (e.g., hard disk) components. In another embodiment, a code image may be loaded through a connection interface 101 from a source external to the device. The connection interface 101 may be based on a USB connection, an Ethernet connection, a wireless network connection (e.g., IEEE 802.11), a serial (e.g. RS233) connection, or other communication interfaces, etc. In one embodiment, codes 115 may cause storing a code image from a device memory into the storage component 109 after verifying the code image includes only trusted codes.

Before the device can start executing the code image loaded in the device memory, PKI codes 125 perform verification operations on the loaded code image to ensure the code image could be trusted. Executing a code image may include locating a binary image from the code image for execution. In one embodiment, PKI codes 125 may verify a loaded code image according to data included in the chip 105, such as the data section 117 inside the ROM, a UID (Unique Identifier) 119 and/or a GID (Global Identifier) 121. UIDs 119 may be unique for each device. In one embodiment, all devices are associated with a single GID 121, which may be associated with a vendor of the device. A GID may be used to encrypt a code image to prevent code inspection. Data section 117 of the ROM 115 may store a root certificate 123 issued by a trusted entity such as a public key certificate. In one embodiment, a GID may be used to generate a public key included in a root certificate such as root certificate 123 of FIG. 1. Different devices may include a common root certificate 123 based on the same trusted entity. An identifier may be a GID or a UID.

Figure 2:
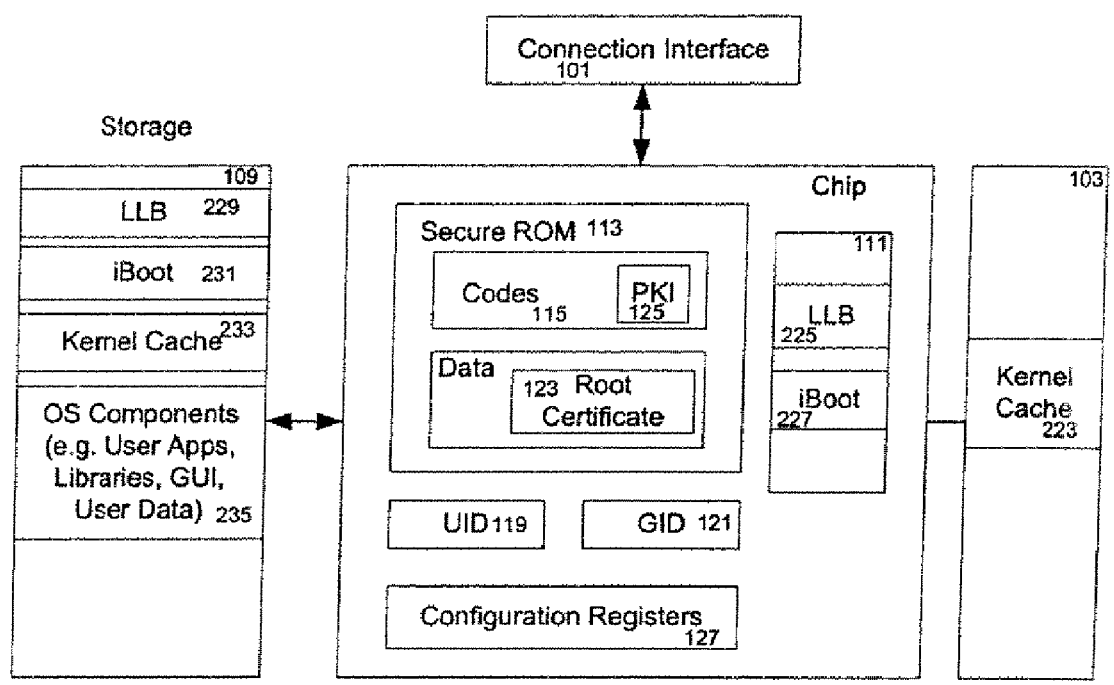
FIG. 2 is a block diagram illustrating one embodiment of system components executing secure booting.

FIG. 2 is a block diagram illustrating one embodiment of system components executing secure booting. System 100 may load an LLB (low level boot) code image 229 from storage component 109 into RAM 111 as LLB 225. Execution of codes 115 may locate or discover code image LLB 229 from storage 109 for booting system 100. LLB 225 may be related to long term power management of the system 100. In one embodiment, LLB 225 may include an identification of a version of system 100. Code image LLB 225 may be loaded based on execution of codes 115. In one embodiment, code image LLB 229 may be stored from RAM 111 based on code image LLB 225 via execution of codes 115.

Code image iBoot 227, according to one embodiment, may be loaded into memory component 111 from storage 109 based on code image iBoot 231 according to execution of LLB 225. Code image iBoot 231 may cause hardware initialization for an operating system that provides an operating environment for the device housing system 100. A device may enter an operating environment after a successful booting. An operating environment may support various user and/or system applications running in the device. In one embodiment, code image iBoot 231 enables mass storage components of the device, initializes graphic components for user interface, and/or activates display components for the device, etc. Code image iBoot 231 may be stored from RAM 111 based on code image iBoot 227 via execution of code image LLB 225. In one embodiment, code image LLB 229 and code image iBoot 231 may be combined into a single code image stored in an external boot device, such as USB device, connected to system 100 via connection interface 101.

According to one embodiment, code image Kernelcache 223 may be loaded from storage 109 to memory 103 based on code image Kernelcache 233. Code image Kernelcache 223 may be part of a kernel of an operating system to support an operating environment for the device. In one embodiment, code image Kernelcache 223 causes a kernel and operating system components 235 to be loaded into memory 103 from storage 109. Operating system components may include user applications, libraries, graphic user interface components, and/or user data 235. User data may include music, images, videos or other digital content associated with a user of the device. For example, such user data may be DRM (digital rights management) compliant data having restricted usages. Code image Kernelcache 223 may enable loading the kernel and the operating system components 235 into memory 103. In one embodiment, code image Kernelcache 223 is verified to ensure the kernel is trusted before being executed in memory 103. In another embodiment, a verification process may be performed by code image Kernelcache 223 to ensure that an operating system component 235 is trusted before being executed in memory 103. Code image Kernelcache 223 may be executed to determine whether an operating system component 235 is trusted based on UID 119 or root certificate 123. In one embodiment, code image Kernelcache 223 is executed to decrypt an operation system component 235 in memory 103, e.g. according to GID 121. In another embodiment, code image Kernelcache 223 is executed to store operating system components 235 from memory 103 into storage 109. Code image Kernelcache 223 may be executed to encrypt operating system components 235 before operating system components 235 are stored in the storage 109.

According to one embodiment, each of image codes LLB 229, iBoot 231 and Kernelcache 233 includes codes similar to PKI codes 125 inside secure ROM 113 to perform verification and authentication processes on certain sub-components. Each of LLB 225, iBoot 231, Kernelcache 233, and codes 115 inside secure ROM 113 may be built from the same source implementing a common security model for verifying whether a separate code image is trusted. Thus, system 100 may be booted via multi-layers of verifications. Each layer, such as associated with secure ROM 113, LLB 225, iBoot 231, and/or Kernelcache 233, performs the similar flows of verification and certification processes. A common security model within each verification and authentication process may assume the device is running in similar environments, such as similar clock speeds, similar memory layouts, availability of common runtime services, etc., when corresponding codes, such as PKI 125, are executed. In one embodiment, secure ROM 113, LLB 225, iBoot 231, and Kernelcache 233 include similar codes implementing a single public key infrastructure within the device hosting system 100. An external boot device, e.g. a USB device coupled to system 100 via connection interface 101, may include both LLB and iBoot code images sharing common codes, similar to PKI codes 125, within the boot device to implement public key infrastructure.

In one embodiment, a software component that will be running within the system must be verified or authenticated prior to the execution of the respective software component, unless the software component satisfies certain predetermined conditions (e.g., provided by a trust vendor or during certain circumstances such as manufacturing of the device or testing of the software components). In one embodiment, the settings of a secure storage area in the system may be associated with a predetermined condition. As a result, any data such as DRM compliant data would not be accessed or compromised without proper verification or authentication.

Figure 3A:
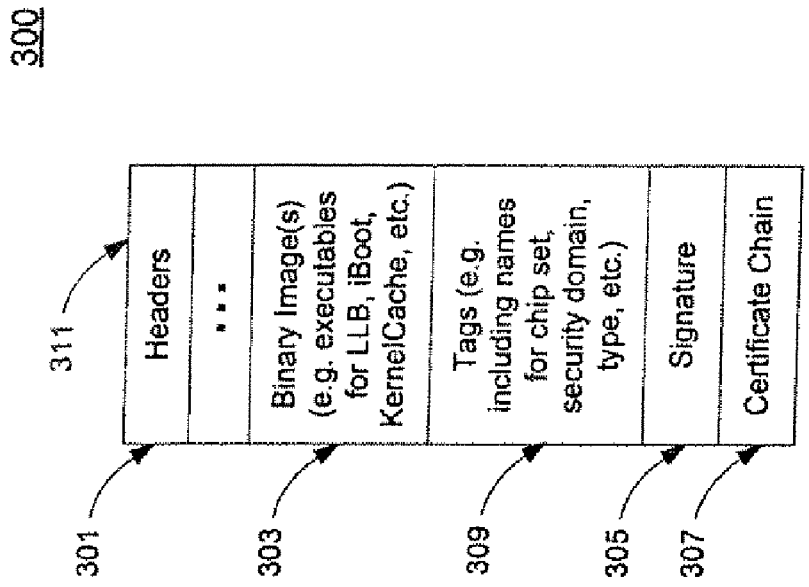
FIGS. 3A-3B are block diagrams illustrating examples of structures representing a code image for secure booting according to certain embodiments of the invention.

FIG. 3A is a block diagram illustrating one exemplary data structure of a code image for secure booting. In one embodiment, code image 311 includes a data structure as a container loaded with one or more binary images 303, such as LLB, iBoot, KernelCache, etc to be executed when booting a device, such as system 100 in FIG. 1. Code image 311 may include one or more headers 301 specifying, for example, a size, a type, and/or version (epoch) numbers associated with binary images 303. Other aspects of a code image may be included in the headers. In some embodiments, relative locations of different parts within a code image, such as binary image 303 or signature 305, etc., may be predetermined or calculated on the fly according to the associated headers, such as headers 301.

In one embodiment, signature 305 may be generated by digitally signing at least a portion of headers 301 binary images 303. For example, signature 305 may be an encrypted hash according to public key cryptography such as RSA (Ralph Shamir Adelman) cryptography. A hash encrypted for signature 305 may be derived over headers 301 and binary images 303 using hashing functions such as, for example, SHA hashing. In one embodiment, a public key is applied for encrypting a hash for signature 305.

A code image may include a sequence of one or more public key certificates as a certificate chain, such as certificate chain 307. A certificate in a chain may be applied to verify the validity of the next certificate in sequence along the chain. Each certificate may embed a separate public key in a format based on, for example, X.509 standard. In one embodiments the public key for decrypting signature 305 may be embedded in a leaf certificate (the last certificate along a certificate chain) of certificate chain 307. In one embodiment, certificate chain 307 may include an intermediate certificate and a leaf certificate. A root certificate may be built into a device, such as root certificate 123 of FIG. 1, to certify the intermediate certificate, which in turn may be used to certify the leaf certificate.

Additionally, according to one embodiment, code image 311 includes one or more tags 309 for specifying compatible devices. For example, a tag from tags 309 may be related to hardware settings of a device, such as, for example, values in Configuration Registers 127 of FIG. 1. In one embodiment, tags 309 designates a name of a compatible security domain, a name of a compatible chip set, a type of compatible devices, or other key value pairs. Binary image 303 may include executable codes performing parsing and matching operations on tags carried within a separate code image. In some embodiments, a binary image, such as binary image 303, inside a code image, such as code image 311, may include common codes, similar to PKI codes 125 of FIG. 1, for performing operations on tags from a separate code image. A code image may be trusted but incompatible in a device which does not allow the code image to execute.

According to certain embodiments of the invention, each of the software components to be installed and loaded in the system is implemented or package as an object, also referred to as an Image3 object having a predetermined format such that a single security processing engine (e.g., code builder and/or code loader) can be used to build and verify each of the object as a mechanism to determine whether each software component is trusted and compatible with certain limitations or criteria of system before executing the executable code embedded within the respective object.

Figure 3B:
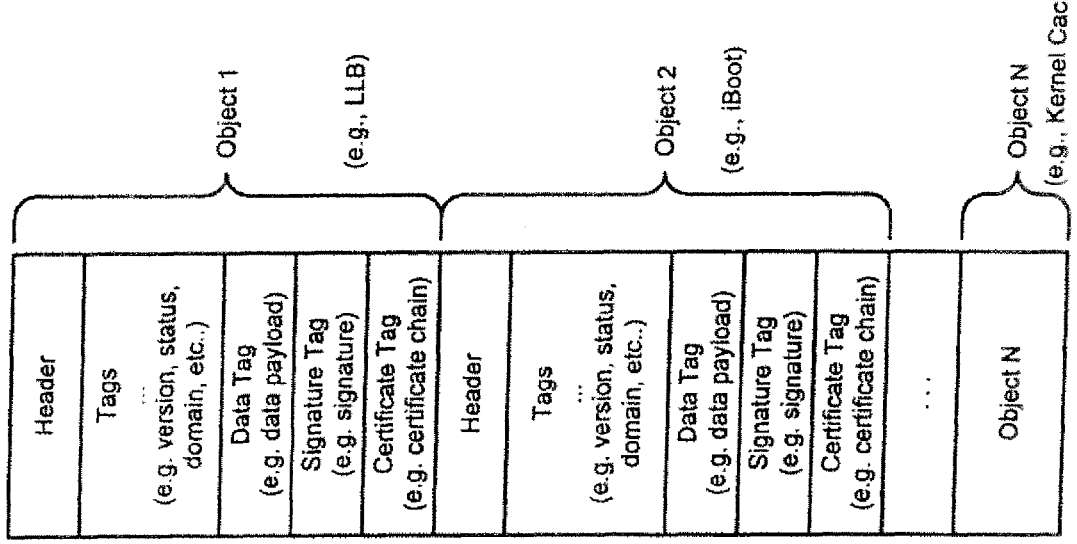

FIG. 3B is a block diagram illustrating an example of data structure representing a layout of an Image3 object according to one embodiment. In this example, there are multiple objects, each representing a software component to be installed and/or executed in an attempt to establish an operating environment of the system, such as, for example, LLB, iBoot, and kernel cache, etc. According to some embodiments, a code builder may build an Image3 object for an executable code, such as LLB, iBoot, or Kernelcache, etc. to be stored in a device (e.g. NOR or NAND flash). A code builder may construct an Image3 object including headers and tags according to at least the following:

The builder encrypts a payload (e.g. DATA tag) with an encryption key.

The builder constructs a key bag tag (e.g. KGAG tag) by storing the encryption key wrapped (licked or encrypted) by a UID or GID.

The builder constructs other tags such as a production status tag (PROD tag), a security domain tag (SDOM tag), a security epoch tag (SEPO tag), etc.

The builder constructs a signature tag (SHSH tag) by performing a hash operation on at least a part of the header (e.g. type of the image code), and one or more constructed tags as specified in the header (e.g. size of signed portion of the Image3 object). The signature tag stores the signed hash.

The builder constructs a certificate chain tag (CERT tag) which stores the certificate chain used to sign the hash stored in the signature tag.

In one embodiment, each object includes a header having information identifying a type of the object (e.g., LLB, iBoot, Kernelcache). The header may further include an offset pointing to a next object in the storage. For example, the header of object 1 may include an offset or pointer pointing to object 2, which has a pointer pointing to object 3, etc. As a result, the same security processing engine can "walk" through the chain of objects to authenticate and verify each object to ensure that each object is trusted before executing the executable code (e.g., payload) of the object.

In one embodiment, data of each object is implemented in one or more tags which are used by the processing engine to verify the object in view of certain information (e.g., configuration registers) embedded within the secure ROM as described above. Similar to the header, each tag includes an offset or pointer pointing to a next tag in the object so that the same processing logic can again "walk" through all tags as a part of authentication and verification processes. For example, a loader in a device may perform at least the following to walk through all tags in an Image3 object:

The loader recovers a certificate chain and evaluates the authenticity of the certificate chain and its authority to be used according to the device configurations.

The loader evaluates its authority over the Image3 object according to device configurations.

The loader evaluates a trust for a buffer of the Image3 object including one or more tags based on a hash value recovered from a signature tag using the authorized certificate chain.

The loader recovers one or more tags and verifies the Image3 object is allowed to be trusted according to the device configurations.

The loader optionally recovers a payload encryption key using the UID/GID associated with the device (e.g. from the SecureROM).

The loader recovers the payload optionally using the encryption key.

The loader loads the payload into the memory.

In one embodiment, an object includes a tag having a hash value representing a signature of the object, where the signature may be signed by a certificate as a part of a certificate chain derived (e.g., an intermediate or a leaf certificate) from a root certificate that matches a fingerprint (e.g., including the root certificate, a UID and/or GID) embedded within the secure ROM. The chain of the certificate may also be stored as one of the tags within the object. A common root certificate may be used across multiple devices or, alternatively, each device may use a separate root certificate.

In this example as shown in FIG. 3B, object 1 includes signature tag having a hash value representing a hash of certain portions of the header and tags of object 1. The hash value is then signed by a certificate obtained from a chain of certificate stored in certificate tag, which is derived from a root certificate embedded within the secure ROM. Thus, when object 1 is examined, the loader executed from the secure ROM can authenticate and/or verify the chain of certificates using the root certificate since the chain of certificates is derived from the root certificate. Once the certificate chain has been authenticated and verified, it can be used to recover the hash (e.g., signature) to verify certain portions of the object.

According to certain embodiments, one of the tags may be used to specify a version of the respective object. Another tag may be used to specify whether the respective object is valid for production mode or development mode, which may require different security processes. Another tag may be used to specify a security domain (e.g., manufacturing) for which the respective object is valid. Another tag may be used to specify a minimum version number, also referred to as a security epoch, in which the object is allowed to run. An object may not be trusted if this tag is not present or the value in this tag is less than the minimum epoch value specified within the secure ROM (e.g., configuration registers or burned fuses). Optionally, certain tags may be used to specify one or more chip IDs (e.g., GID or UID) or board ID (e.g., motherboard identifier) by which this object may trusted. If these tags exist, the one or more chip IDs and/or board ID much match the chip IDs and board IDs embedded within the secure ROM (e.g., configuration registers or burned fuses).

In one embodiment, a payload of an object is also stored in a tag (e.g., data tag). The tag having the payload may further be encrypted by a key which may also be stored in a tag (e.g., key tag). In a further embodiment, the key is further wrapped by a UID/GID embedded within the secure ROM or an external key. Wrapping a data may include one or more encryptions processes performed on at least a portion of the data. In this example as shown in FIG. 3B, Data Tag (e.g., the data payload) of object 1 is encrypted by a key wrapped by the UID/GID embedded within the secure ROM. In one embodiment, a key encrypting a data payload may be wrapped by a GID instead of a UID. The present of this tag signifies that the data payload is encrypted. In order to decrypt (e.g. unwrap) the payload, the encryption or decryption key must be first recovered using the UID/GID of the secure ROM and then the payload is decrypted using the recovered key. As a result, even if the object were compromised, the compromised object cannot be verified since it did not match the UID/GID of the secure ROM.

In a further embodiment, an entire object image is embedded or signed by a leaf certificate, which is derived from a root certificate or a sub-CA certificate (e.g., intermediate certificate) for further security. As a result, the entire object image can be verified by authenticating the leaf certificate using the root certificate, before verifying detailed signatures and tags embedded within the object. If the leaf certificate cannot be verified, there is no need to verify the rest of the security components.

Figure 3C:
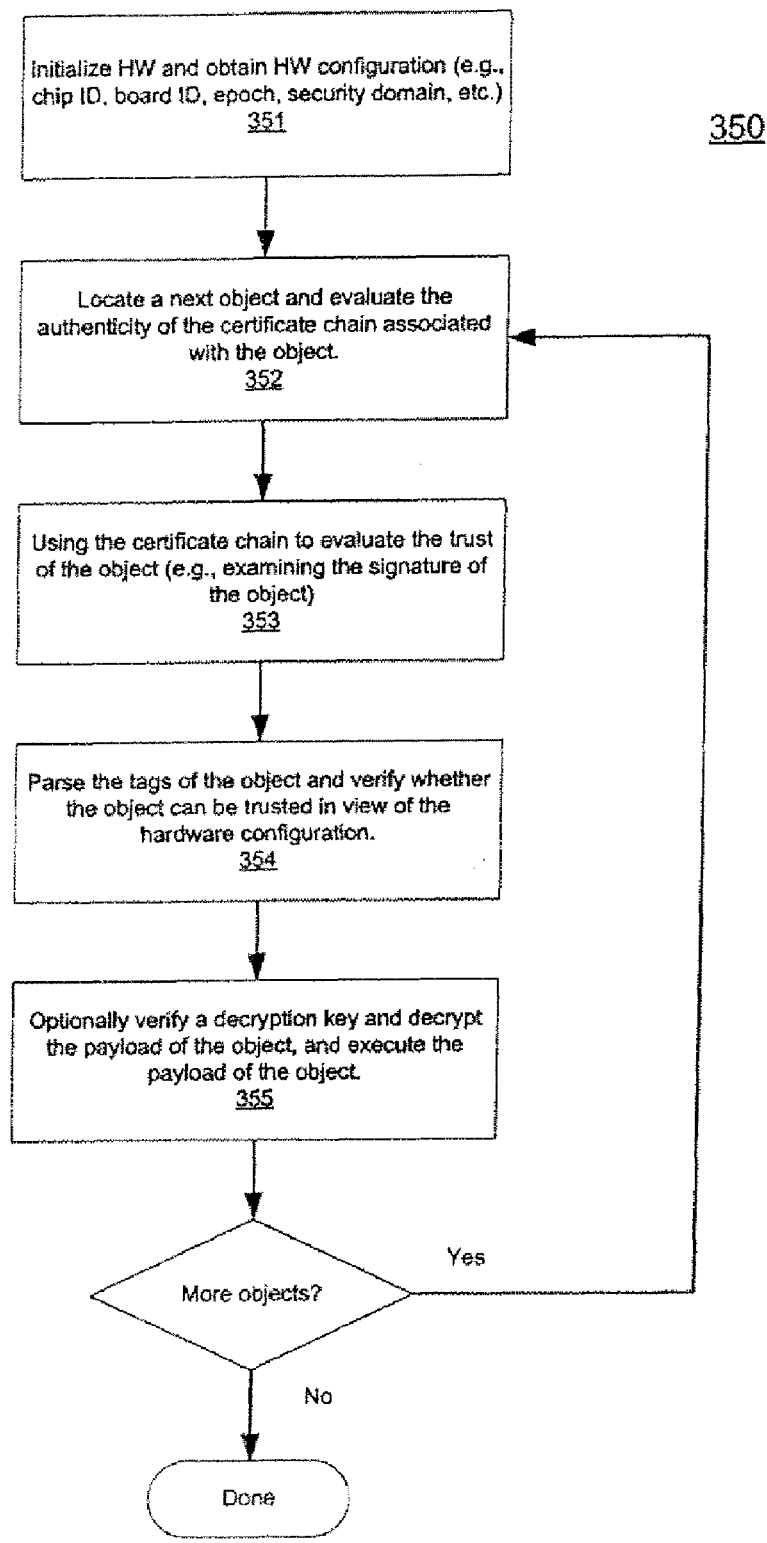
FIG. 3C is a flow diagram illustrating a process for verifying a sequence of objects according to one embodiment of the invention.

FIG. 3C is a flow diagram illustrating a process for verifying and loading a sequence of objects according to one embodiment of the invention. Note that process 350 may be performed by processing logic which may include software, hardware, or a combination of both. For example process 350 may be performed by code 115 of FIG. 1. Referring to FIG. 3C, at block 351, processing logic initializes hardware and obtain hardware configuration, such as, for example, UID/GID, board ID, security domain, etc. This information may be obtained from hardware configuration registers such as fuse settings.

At block 352, processing logic locates a next object in a storage, for example, based on the header information associated with the object. As described above, the object may be signed by or embedded within a leaf certificate of a certificate chain which is derived from a root certificate embedded within the secure ROM. As a result, the processing logic authenticates the certificate chain using the root certificate from the secure ROM. Once the certificate has been authenticated, at block 353, the certificate chain is used to evaluate the trust of the object. For example, as described above, the certificate chain obtained from a certificate chain tag (e.g., "CERT" tag) is used recover the signature (e.g., a hash value) stored in a signature tag (e.g., "SHSH" tag) and the recovered signature is then used to verify the integrity of certain portions of the object.

Once the signature of the object has been verified, at block 354, processing logic parses one or more tags implemented within the object against the hardware configuration embedded within the secure ROM to determine whether the object is intended and allowed to run within an operating environment within the hardware of a device having those specific configuration obtained at block 351. For example, certain tags may be parsed to match the chip ID (e.g., UID/GID), board ID, security domain, minimum epoch, etc.)

Specifically, if the object is designed to run in a production module while the hardware configuration of the device indicates that the device is a development module, processing logic may not successfully parse the corresponding tag of the object since the information between the tags of the object and the hardware configuration of the device do not match. Similarly, if the system hardware specifies a minimum epoch number (e.g., minimum version), any object having an epoch number less than the minimum epoch number specified in the hardware cannot be verified and loaded. This will prevent a user from running older versions of software in a newer version of the hardware.

Optionally at block 355, if the payload of the object is encrypted, the decryption key is recovered from one of the tag using a UID/GID or a predetermined key. The decryption key is then used to decrypt the payload of the object and thereafter, the decrypted payload can be executed. Since the key to wrap the encryption/decryption key is device/vendor specific, even if the payload is compromised, the compromised payload may not match the specific key for encryption. As a result, the compromised payload can be verified whether it is trusted. The above processes repeat until all of the objects have been processed. Note that all of the objects are processed by the processing logic derived from the same code.

Figure 4:
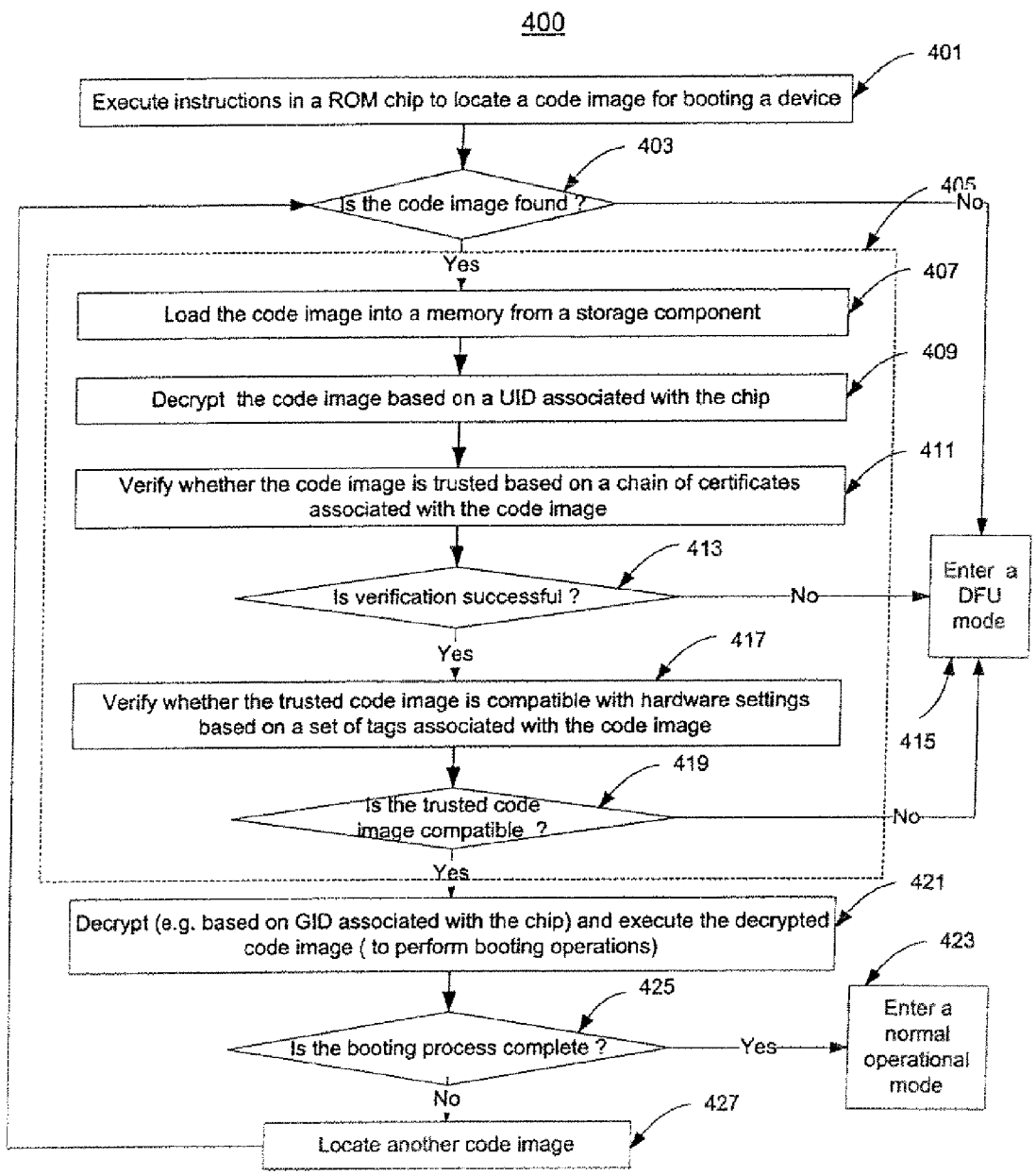
FIG. 4 is a flow diagram illustrating one embodiment of a process to verify a code image for secure booting.

FIG. 4 is a flow diagram illustrating one embodiment of a process to verify a code image for secure booting. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. Exemplary process 400 may be performed, for example, when executing PKI codes 125 of FIG. 1. At block 401, according to one embodiment, the processing logic of process 400 locates a code image within the device by executing instructions in a ROM chip, such as secure ROM 113 of FIG. 1. The instructions may be read from a code section of the ROM chip such as codes 115 of FIG. 1. The code image may be stored in a memory component or a storage component of the device, which may be a RAM. A storage component may be a flash memory or a mass storage device attached to the device. In one embodiment, a code image is located by searching one or more storage units associated with a device in sequence, such as a NOR flash, a NAND flash, a mass storage or an attached USB (Universal Serial Bus) unit. In some embodiments, locations for storing a code image for booting a device may be predetermined. If the code image could not be located, the booting process may be interrupted and the device may enter a DFU (Device Firmware Upgrade) or a recovery mode at block 415. If the code image is located successfully, the processing logic of process 400 loads the code image into a memory at block 407. In one embodiment, at block 409, the processing logic of process 400 decrypts the loaded code image based on an embedded identifier within a device, such as UID 109 of FIG. 1. In another embodiment, the code image may have already been loaded in the memory when located.

At block 411, according to one embodiment, the processing logic of process 400 certifies whether the loaded code image could be trusted based on a chain of certificates associated with the code image, such as certificate chain 307 within code image 311 of FIG. 3A. The processing logic of process 400 may certify the first certificate along the chain based on a root certificate embedded in the device, such as root certificate 123 of FIG. 1. Each certificate may be certified in turn via its previous or parent certificate along the chain. The processing logic of process 400 may certify portions of a code image other than the certificate chain, such as binary images 303 and headers 301 of FIG. 3A, based on the last certificate in the chain, namely, the leaf certificate. In one embodiment, the processing logic of process 400 performs each certification along the chain based on codes implementing public key infrastructure, such as codes common to PKI codes 125 of FIG. 1. To certify a binary image included in a code image, the processing logic of process 400 may perform a similar certification as in certifying a certificate along the chain.

Figure 5:
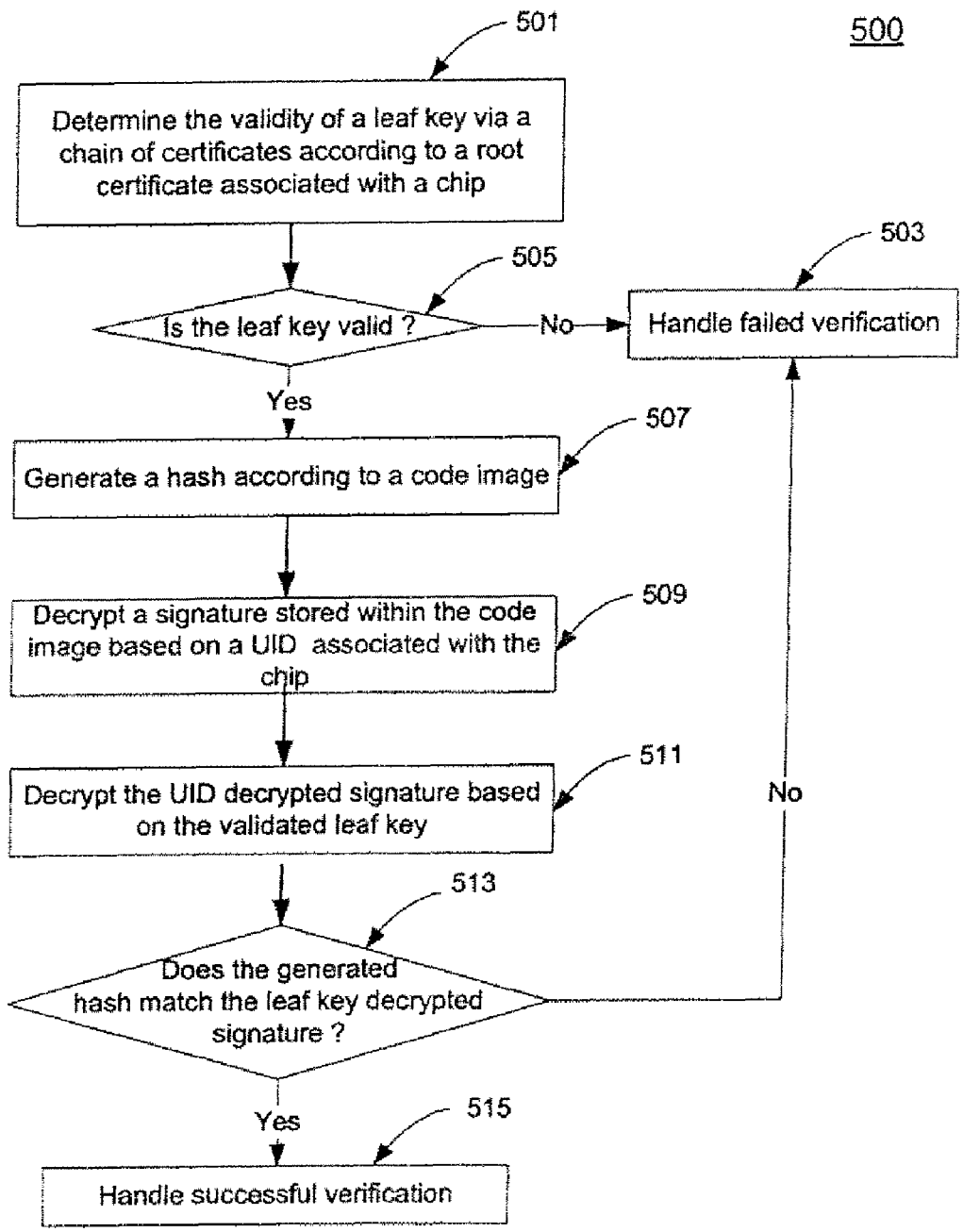
FIG. 5 is a flow diagram illustrating one embodiment of a process to certify the trust of a code image.

FIG. 5 is a flow diagram illustrating one embodiment of a process to certify the trust of a code image. Exemplary process 500 may be performed by a processing logic that may comprise hardware (circuitry, dedicated logic, etc.), software (such as is run on a dedicated machine), or a combination of both. For example, process 500 may be performed by the processing logic of process 400 at block 411 of FIG. 4. In one embodiment, at block 501, the processing logic of process 500 determines whether a leaf key is valid via a chain of certifications rooted at a root certificate, such as performed by the processing logic of process 400 at block 411 of FIG. 4. A leaf key may be a public key embedded in a leaf certificate of a certificate chain. When a leaf certificate is certified, the included leaf key is considered valid. If a leaf key is determined not valid, the processing logic of process 500 performs operations to handle failed verifications at block 503, such as, for example, cause a device to enter a DFU mode.

If a leaf key is determined valid at block 505, the processing logic of process 500 generates a hash over at least a portion of a code image, such as headers 301 and binary images 303 of FIG. 3A. In one embodiment, the processing logic of process 500 generates a hash according to an implementation of public key infrastructure, such as, for example, SHA hashing functions. At block 509, the processing logic of process 500 decrypts a signature stored within a code image, such as signature 305 of FIG. 3A, according to a unique identifier embedded within a device, such as UID 119 of FIG. 1. In one embodiment, a signature may be extracted from a code image based on a predetermined location or a location determined on the fly according to headers included in a code image, such as headers 301 of FIG. 3A.

At block 511, the processing logic of process 500 may decrypt a UID decrypted signature using the validated leaf key from a leaf certificate in the certificate chain based on codes, for example, similar to PKI codes 125 of FIG. 1. In one embodiment, decrypting a UID decrypted signature may be performed based on RSA cryptography. Subsequently, the processing logic of process 500 matches the hash generated at block 507 with the decrypted signature to verify if a code image is trusted at block 513. If the hash matches the decrypted signature, the processing logic of process 500 continues performing other operations based on a trusted code image at block 515. Otherwise, the processing logic of process 500 proceeds at block 503 in response to a code image determined not to be trusted.

Referring back to FIG. 4 at block 413, the processing logic of process 400 determines if a verification of a trust for a code image is successful or not. If a trust is not successfully verified, the processing logic of process 400 may cause the device to enter a DFU mode at block 415. Otherwise, for a trusted code image, the processing logic of process 400 may verify whether a trusted code image is compatible with device settings at block 417. In one embodiment, device settings are associated with configuration registers, such as configure registers 127 of FIG. 1, according to hardwired device setup. In some embodiments, a device setup may be updated by burning certain fuses on the device when the device is released from manufacturing or in a later phase. The processing logic of process 400 may compare tags embedded in a trusted code image, such as tags 309 of FIG. 3A, with values read from configuration registers to determine whether the trusted code image is indeed compatible with the underlying device. A tag may include a key value pair. For example, a tag may be a security domain tag, a usage tags a device type tag, or other tags etc. A security domain tag may include a value to indicate one or more compatible security domains (e.g., manufacturing or certain customized releases) for a code image. Similarly, a usage tag may include values that refer to whether a code image is used for production or development. Additionally a device type tag may specify which chip set a code image is intended for. For each tag in a code image, the processing logic of process 400 may select one or more configuration registers to match with a tag value (e.g. identical in values or based on a predetermined relationship). In one embodiment, a trusted code image is determined compatible with a device at block 419 if each tag included in the trusted code image matches hardware settings of the device. Otherwise, the processing logic of process 400 may cause the device to enter a DFU mode at block 415.

At block 421, in one embodiment, the processing logic of process 400 executes a trusted code image compatible with a device for performing booting operations for an operating environment of the device. In one embodiment, a trusted code image may be decrypted based on key derived from an identifier embedded in a chip, such as GID 121 of FIG. 1, before being executed. Execution of a code image may include locating an executable binary image, such as binary image 303 of FIG. 3A from the code image to execute. At block 425, the processing logic of process 400 may determine whether booting operations have completed for a device. If yes, the processing logic of process 400 may allow or enable the device to enter a normal operating mode at block 423. Otherwise, the processing logic of process 400 may locate another code image to continue the booting operations at block 427.

Figure 6:
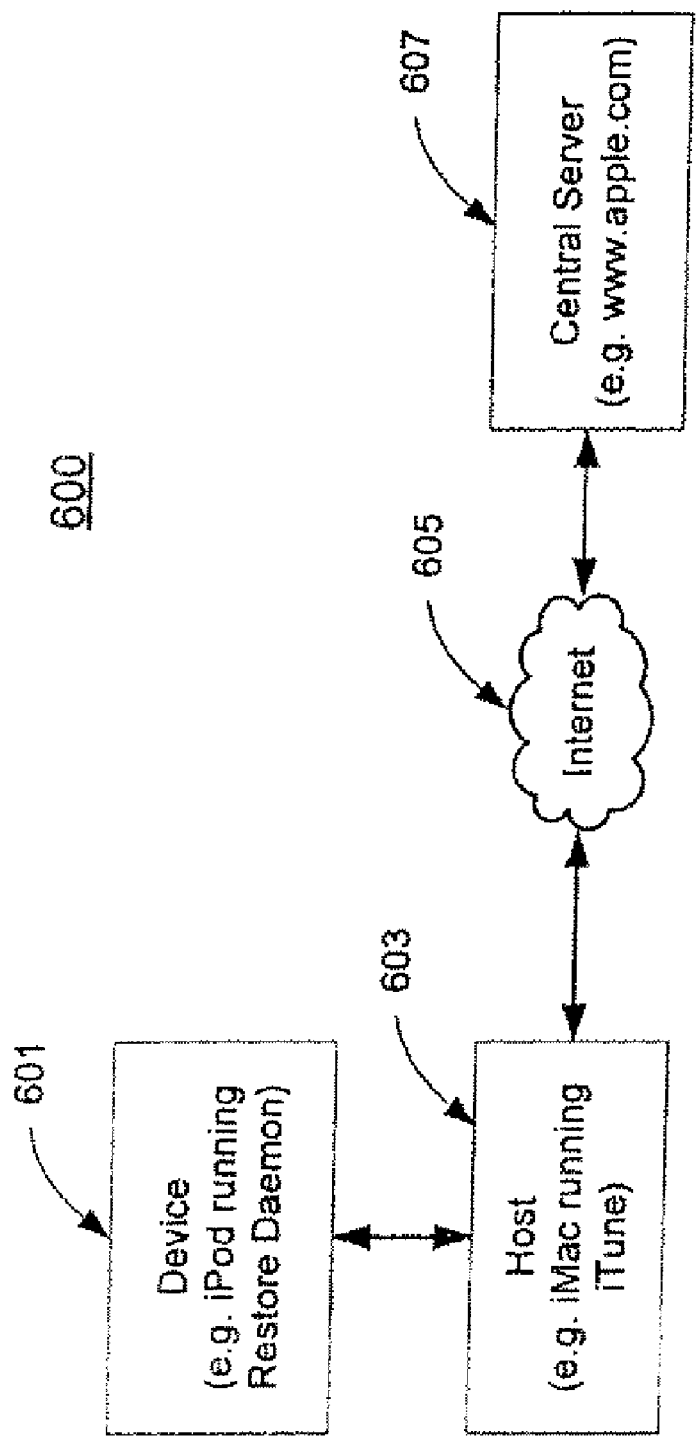
FIG. 6 is a block diagram illustrating one embodiment of network connections for a host to enable securely booting a device.

FIG. 6 is a block diagram illustrating one embodiment of network connections for a host to securely boot a device, such as, for example, based on the system of FIG. 1. In one embodiment, a device may enter a DFU mode for booting from an external source communicatively coupled to the device, such as, for example, a remote host connected to the device. In another embodiment, an external source may be a USB device plugged into a device via a connection interface, such as connection interface 101 of FIG. 1. A device may be forced to enter a DFU mode based on an initiation from a user. In one embodiment, a device may enter a DFU mode in response to a user performing a predetermined action such as pressing a button of the device. A user may request a device to enter a DFU mode for performing system management tasks for the device, including, for example, cleaning up user data, upgrading hardware drivers, upgrading user applications, and/or installing new applications, etc. A device may automatically enter a DFU mode when the device fails to boot in at least one stage of the booting sequence, such as shown at block 415 of FIG. 4. Alternatively, a device may enter a DFU mode when the operating system encounters an abnormality during normal operation such as when a corrupted data or damaged software components are detected.

According to one embodiment, network configuration 600 includes a device 601 coupled with a host 603. Device 601 may be a media player such as, for example, an iPod from Apple Inc. running a restoring daemon application to restore operating system components from the coupled host 603. Device 601 may be coupled with host 603 through a connection interface supporting a variety of protocols such as TCP/IP protocols. The connection interface may be based on USB, a wireless network or an Ethernet, etc. In one embodiment, host 603 may be a Mac or Windows based computer running application software such as, for example, an iTune application from Apple Inc. Host 603 may be connected to a central server 607 through the network 605 such as wide area network (e.g., Internet) or local area network (e.g., Intranet or peer-to-peer network). In one embodiment, central server 607 may be based on a publicly accessible web server. Alternatively, server 607 may be an Intranet or local server.

Figure 7:
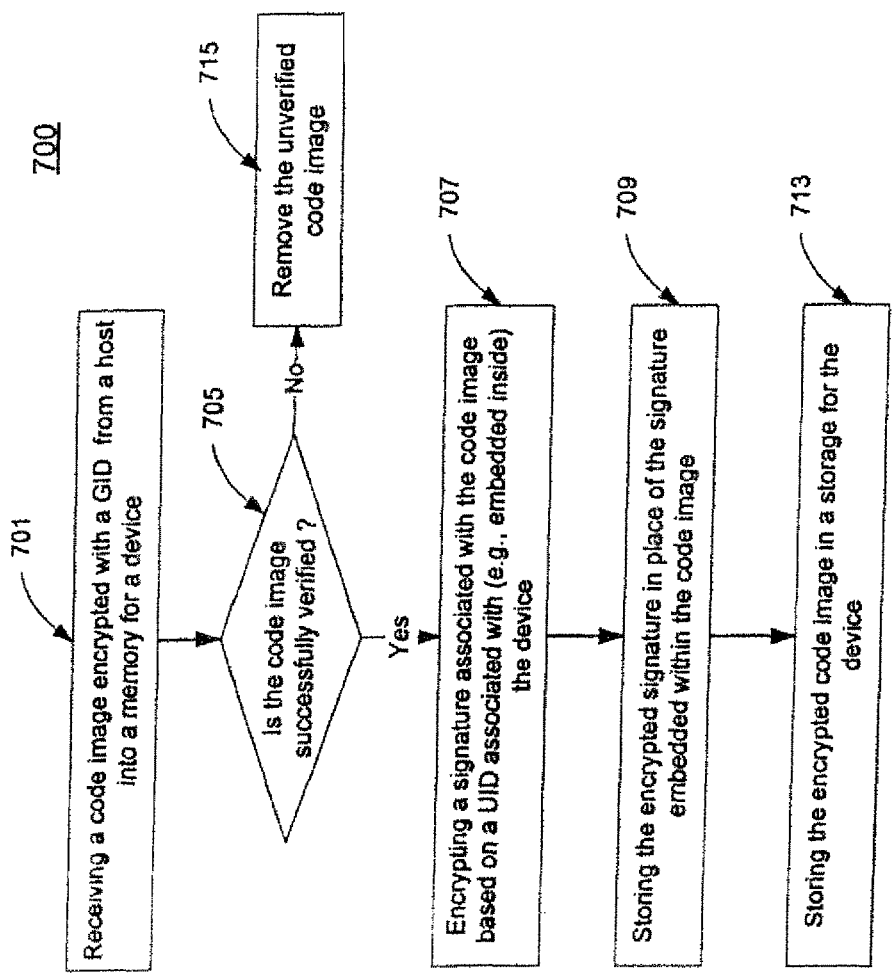
FIG. 7 is a flow diagram illustrating one embodiment of a process to verify an image code received from a host.

FIG. 7 is a flow diagram illustrating one embodiment of a process to verify an image code received from a host. Exemplary process 700 may be performed by a processing logic that may comprise hardware (circuitry, dedicated logic, etc.), software (such as is run on a dedicated machine), or a combination of both. For example, process 700 may be performed by some components of system 100 of FIG. 1. In one embodiment, the processing logic of process 700 receives a code image from a host computer for a device at block 701. A code image, when received, may be encrypted using a key derived from an identifier stored in a chip inside the device, such as GID 121 or a public key included in root certificate 123 of FIG. 1. A GID encrypted code image may guard against direct code inspection on the device and/or while in transit for additional security. A code image may be executed to boot a device, to run an application for the device, or to provide other functions and/or data to the device. In some embodiments, a code image includes data required for running an application in the device. The device and the host computer may be remotely coupled as shown in FIG. 6. The processing logic of process 700 may receive a code image into a memory of a device such as, for example, a code image embedding binary image LLB 225 in FIG. 1. In one embodiment, the code image is retrieved from a central server computer connected over a network such as network 605 as shown in FIG. 6. A received code image may include a signature, such as, for example, signature 305 of FIG. 3A, digitally signed by a central authority associated with the central server computer.

At block 705, according to one embodiment, the processing logic of process 700 may determine whether a received code image can be successfully verified. A successfully verified code image may be both trusted and compatible with an underlying hardware as determined according to similar operations as performed by processing logic of process 400 at block 405 of FIG. 4, including process 500 of FIG. 5. In one embodiment, the processing logic of process 700 does not need to perform a UID decrypting operation, such as in block 509 of FIG. 5, to extract a signature embedded within a code image received. As a UID for a device cannot be known outside of the device, an external code image may not include a signature encrypted by the UID embedded inside the device.

At block 707, if a received code image, such as code image 311 of FIG. 3A, is successfully verified, the processing logic of process 700 encrypts the signature associated with the code image, such as signature 305 of FIG. 3A, based on a UID embedded inside the device. Otherwise, at block 705, the processing logic of process 700 may discard the received code image, which is either not trusted and/or not compatible with the underlying hardware. In one embodiment, the processing logic of process 700 may store a UID encrypted signature in place of the signature embedded within the received code image to update the received code image at block 709. Thus, the updated code image and the received code image may share the same structure, such as code image 311 of FIG. 3A or the one as shown in FIG. 3B and differ only in values of the signatures embedded. Other devices may not certify the updated image code as the UID associated with the encrypted signature is not available outside the device which updates the image code.

In one embodiment, at block 713, the processing logic of process 700 may then store the encrypted code image in a storage device of the device, such as storage 109 of FIG. 1. An encrypted code image may include a received code image from outside a device updated by a UID encrypted signature and encrypted by a GID of the device.

Figure 8:
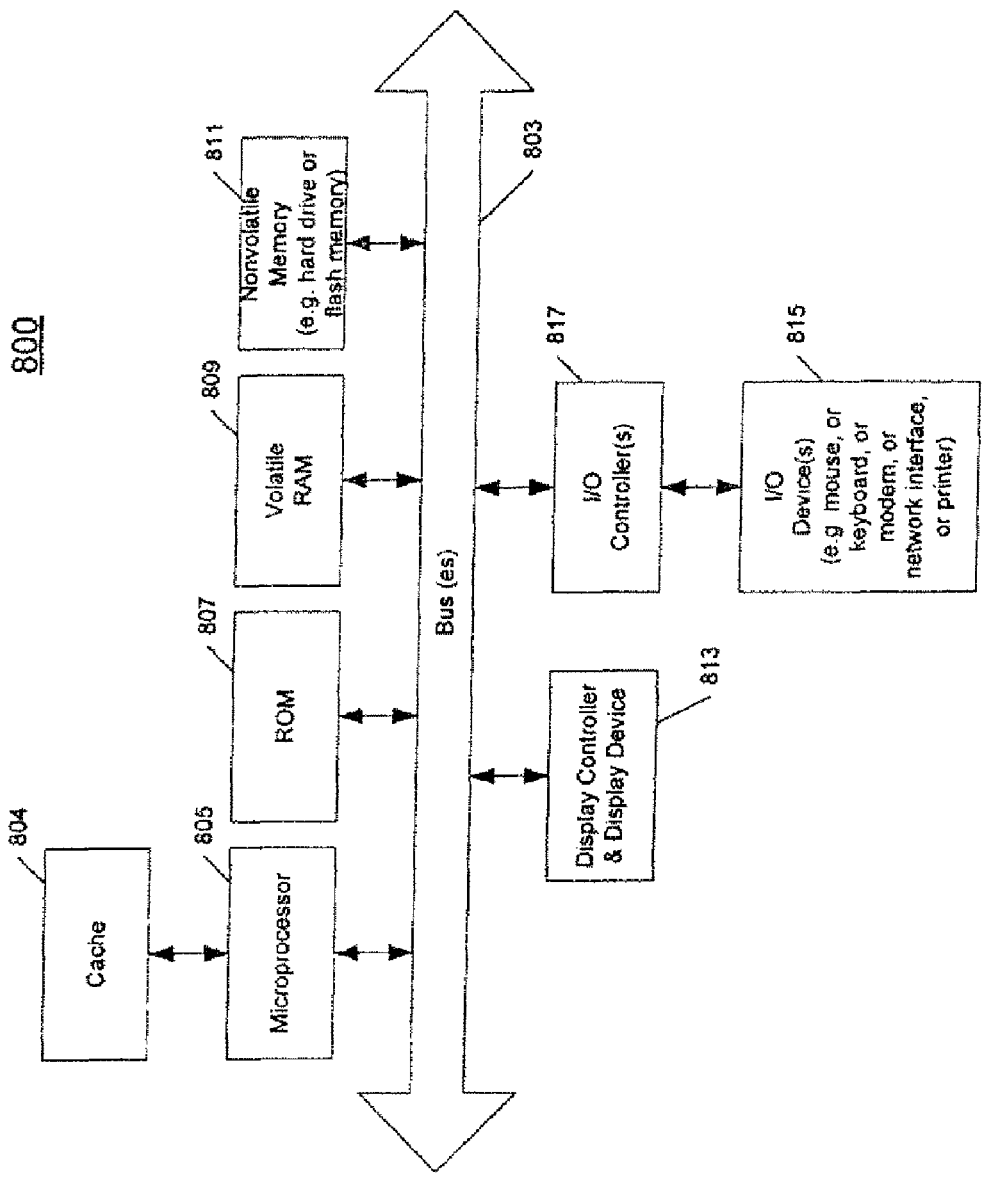
FIG. 8 illustrates one example of a typical computer system which may be used in conjunction with the embodiments described herein.

FIG. 8 shows one example of a data processing system which may be used with one embodiment the present invention. For example, the system 800 may be implemented including a host as shown in FIG. 5. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
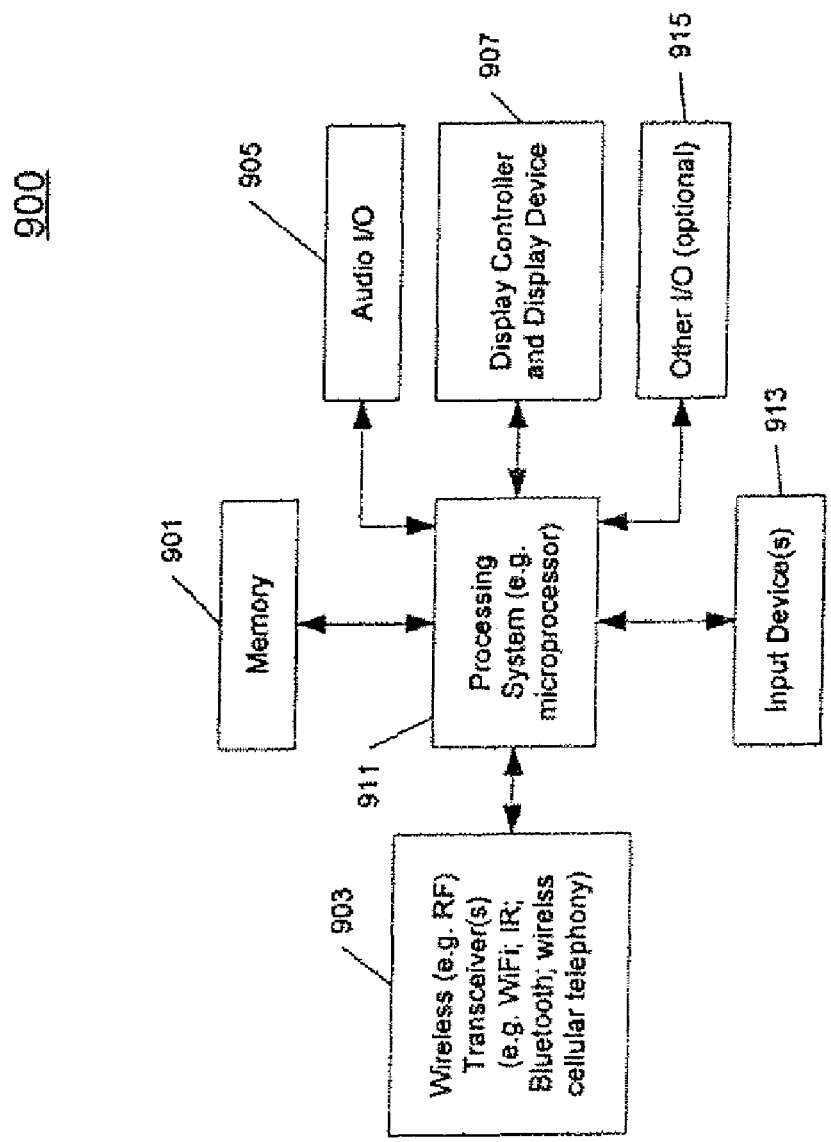
FIG. 9 shows an example of a data processing system which may be used with one embodiment of the present invention.

FIG. 9 shows an example of another data processing system which may be used with one embodiment of the present invention. For example, system 900 may be implemented as part of system as shown in FIG. 1. The data processing system 900 shown in FIG. 9 includes a processing system 911, which may be one or more microprocessors, or which may be a system on a chip integrated circuit and the system also includes memory 901 for storing data and programs for execution by the processing system. The system 900 also includes an audio input/output subsystem 905 which may include a microphone and a speaker for, for example, playing back music or providing telephone functionality through the speaker and microphone.

A display controller and display device 907 provide a visual user interface for the user, this digital interface may include a graphical user interface which is similar to that shown on a Macintosh computer when running OS X operating system software. The system 900 also includes one or more wireless transceivers 903 to communicate with another data processing system, such as the system 1100 of FIG. 11. A wireless transceiver may be a WiFi transceivers an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system.

The data processing system 900 also includes one or more input devices 913 which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a portable gaming device, or a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or other types of data processing systems which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)). The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:
  in response to a software component received at a device, wherein the device includes one or more keys embedded within a secure memory of the device and one or more hardware configuration settings of the device, wherein the software component is packaged under a predetermined format including one or more headers and at least one signature tag, executing security code on the predetermined format to verify the software component, the execution of the security code comprising:
    authenticating the signature tag to determine if the software component can be trusted, and
    matching, if the software component is trusted, the headers of the software component and the hardware configuration settings of the device to determine if the software component is compatible with the device,
    wherein the software component is verified if the software component is trusted and compatible with the device,
  personalizing the software component using the keys for the device if the software component is successfully verified via the security code, wherein the personalized software component differs from the software component in the signature tag;
  in response to a plurality of software components to be executed in sequence in order to establish an operating environment of the device, each software component packaged under the predetermined format, executing the security code on the predetermined format for each software component to verify each software component using the keys of the device and the hardware configuration settings of the device, wherein the software components include the personalized software component; and
  in response to successfully verifying a particular one of the software components, executing the particular software component in a main memory of the device, wherein the software components are executed following the sequence to establish the operating environment.

2. The method of claim 1, wherein at least one of the software components includes executable code having the security code, and wherein the executable code in the at least one software component is developed based on a common source code for the security code.

3. The method of claim 2, wherein in response to a first one of the software components in the sequence, the security code to verify the first software component in the sequence is stored and executed from secure memory of the device.

4. The method of claim 2, wherein each predetermined format is based on an object having a common layout scheme to allow the security code to parse, authenticate, and verify the object according to a common security scheme designed based on the common source code.

5. The method of claim 4, wherein a certificate chain is embedded within the object, the certificate chain including a leaf certificate, wherein the method further comprises authenticating the leaf certificate using one of a root certificate and an intermediate certificate that are derived from the one or more keys embedded within the secure memory.

6. The method of claim 5, further comprising verifying a signature and embedded within the object to determine whether integrity of the object has been compromised.

7. The method of claim 6, wherein the signature represents a hash of a predetermined portion of the object and signed by the certificate chain, wherein the method further comprises:
  recovering the hash using the certificate chain;
  performing a second hash on the predetermined portion of the object; and matching the second hash with the recovered hash to determine whether both hashes are identical in order to determine whether the integrity of the object has been compromised.

8. The method of claim 6, further comprising:
retrieving one or more attributes from the object, the one or more attributes specifying one or more conditions of the operating environment to be satisfied before allowing the object to be executed; and
comparing the one or more attributes with at least a portion of the hardware configuration settings of the device, wherein the object is allowed to be executed only if the one or more attributes satisfy the at least a portion of the hardware configuration.

9. The method of claim 8, wherein the software component is stored as a payload of the object, wherein the payload is encrypted by an encryption/decryption key which is wrapped by an identifier associated with the device and stored in the secure memory, and wherein the encryption/decryption key is recovered using the identifier of the device and is used to decrypt the payload of the object in order to recover software component.

10. The method of claim 1, wherein the one or more keys stored in the secure memory are derived from credentials that uniquely represent characteristics of the device, including a unique identifier (UID) that uniquely identifies the device, and wherein the hardware configuration settings are configured via hardwiring one or more hardware registers of the device.

11. A machine-readable non-transitory medium having instructions stored therein, which when executable by a machine, cause the machine to perform a method, the method comprising:
in response to a software component received at a device, wherein the device includes one or more keys embedded within a secure memory of the device and one or more hardware configuration settings of the device, wherein the software component is packaged under a predetermined format including one or more headers and at least one signature tag, executing security code on the predetermined format to verify the software component, the execution of the security code comprising:
authenticating the signature tag to determine if the software component can be trusted, and
matching, if the software component is trusted, the headers of the software component and the hardware configuration settings of the device to determine if the software component is compatible with the device, wherein the software component is verified if the software component is trusted and compatible with the device,
personalizing the software component using the keys for the device if the software component is successfully verified via the security code, wherein the personalized software component differs from the software component in the signature tag;
in response to a plurality of software components to be executed in sequence in order to establish an operating environment of the device, each software component packaged under the predetermined format, executing the security code on the predetermined format for each software component, to verify each software component using the keys of the device and the hardware configuration settings of the device, wherein the software components include the personalized software component; and
in response to successfully verifying a particular one of the software components, executing the particular software component in a main memory of the device, wherein the software components are executed following the sequence to establish the operating environment.

12. The machine-readable medium of claim 11, wherein at least one of the software components includes executable code having the security code, and wherein the executable code in the at least one software component is developed based on a common source code for the security code.

13. The machine-readable medium of claim 12, wherein in response to a first one of the software components in the sequence, the security code to verify the first software component in the sequence is stored and executed from secure memory of the device.

14. The machine-readable medium of claim 12, wherein each predetermined format is based on an object having a common layout scheme to allow the security code to parse, authenticate, and verify the object according to a common security scheme designed based on the common source code.

15. The machine-readable medium of claim 14, wherein a certificate chain is embedded within the object, the certificate chain including a leaf certificate, wherein the method further comprises authenticating the leaf certificate using one of a root certificate and an intermediate certificate that are derived from the one or more keys embedded within the secure memory.

16. The machine-readable medium of claim 15, wherein the method further comprises verifying a signature and embedded within the object to determine whether integrity of the object has been compromised.

17. The machine-readable medium of claim 16, wherein the signature represents a hash of a predetermined portion of the object and signed by the certificate chain, wherein the method further comprises:
recovering the hash using the certificate chain;
performing a second hash on the predetermined portion of the object; and
matching the second hash with the recovered hash to determine whether both hashes are identical in order to determine whether the integrity of the object has been compromised.

18. The machine-readable medium of claim 16, wherein the method further comprises:
retrieving one or more attributes from the object, the one or more attributes specifying one or more conditions of the operating environment to be satisfied before allowing the object to be executed; and
comparing the one or more attributes with at least a portion of the hardware configuration settings of the device, wherein the object is allowed to be executed only if the one or more attributes satisfy the at least a portion of the hardware configuration.

19. The machine-readable medium of claim 18, wherein the software component is stored as a payload of the object, wherein the payload is encrypted by an encryption/decryption key which is wrapped by an identifier associated with the device and stored in the secure memory, and wherein the encryption/decryption key is recovered using the identifier of the device and is used to decrypt the payload of the object in order to recover the software component.

20. The machine-readable medium of claim 11, wherein the one or more keys stored in the secure memory are derived from credentials that uniquely represent characteristics of the device, including a unique identifier (UID) that uniquely identifies the device, and wherein the hardware configuration settings are configured via hardwiring one or more hardware registers of the device.

21. An electronic device, comprising:
one or more hardware configuration registers to specify one or more hardware settings associated with the electronic device;

a storage to store a plurality of software components to be executed in order to establish an operating environment of the electronic device, each software component packaged under a predetermined format;

a secure memory to store one or more keys associated with the electronic device and a security code; and a processor coupled to the registers, the storage and the secure memory, wherein the processor is configured to:

in response to a software component received at the device, wherein the software component is packaged under the predetermined format including one or more headers and at least one signature tag, execute security code on the predetermined format to verify the software component, the execution of the security code comprising:

authenticating the signature tag to determine if the software component can be trusted, and matching, if the software component is trusted, the headers of the software component and the hardware configuration settings of the device to determine if the software component is compatible with the device, wherein the software component is verified if the software component is trusted and compatible with the device, personalize the software component using the keys for the device if the software component is successfully verified via the security code, wherein the personalized software component differs from the software component in the signature tag;

execute the security code on the predetermined format for each of the software components to verify each software component using the keys of the device and the hardware configuration settings of the device, wherein the software components include the personalized software component; and in response to successfully verifying a particular one of the software components, execute the particular software component in a main memory of the device, wherein the software components are executed following the sequence to establish the operating environment 22. A computer-implemented method, comprising:

receiving an executable code image representing a software component to be installed in an electronic device having hardware configurations, the software component being used to establish an operating environment of the electronic device;

performing a hash of at least a portion of the executable code image to generate a signature for the executable code image using a certificate of a certificate chain derived from a root certificate that matches a fingerprint embedded within a secure memory of the electronic device to establish a trust of the software component;

providing one or more headers to specify compatible configurations for the software component, the headers to allow a security code to match the hardware configurations of the electronic device with the compatible configurations to determine whether the software component is compatible with the electronic device; and encapsulating the signature, the certificate chain, the headers and the executable code image into an object signed by a leaf certificate of the certificate chain, the object being packaged under a predetermined format, wherein a plurality of objects including the object are to be stored in a storage within the electronic device, each object packaged under the predetermined format representing a separate software component, the plurality of objects having an ordered sequence such that each object can be subsequently authenticated and verified according to the ordered sequence by the security code based on the predetermined format before being loaded in order to establish an operating environment of the electronic device.

23. The method of claim 22, further comprising:

encrypting the executable code image using an encryption key prior to embedding the encrypted executable code image in the object;

wrapping the encryption key using an identifier that identifies one or more devices including the electronic device; and embedded the encryption key wrapped by the identifier in the object, such that a decryption key corresponding to the encryption can only be recover subsequently using the identifier associated with the electronic device in order to decrypt the executable code image embedded therein.

24. A machine-readable non-transitory medium having instructions stored therein, which when executable by a machine, cause the machine to perform a method, the method comprising:

receiving an executable code image representing a software component to be installed in an electronic device having hardware configurations, the software component being used to establish an operating environment of the electronic device;

performing a hash of at least a portion of the executable code image to generate a signature for the executable code image using a certificate of a certificate chain derived from a root certificate that matches a fingerprint embedded within a secure memory of the electronic device to establish a trust of the software component;

providing one or more headers to specify compatible configurations for the software component, the headers to allow a security code to match the hardware configurations of the electronic device with the compatible configurations to determine whether the software component is compatible with the electronic device; and encapsulating the signature, the certificate chain, the headers and the executable code image into an object signed by a leaf certificate of the certificate chain, the object being packaged under a predetermined format, wherein a plurality of objects including the object are to be stored in a storage within the electronic device, each object packaged under the predetermined format representing a separate software component, the plurality of objects having an ordered sequence such that each object can be subsequently authenticated and verified according to the ordered sequence by the security code based on the predetermined format before being loaded in order to establish an operating environment of the electronic device.

25. The machine-readable medium of claim 24, wherein the method further comprises:

encrypting the executable code image using an encryption key prior to embedding the encrypted executable code image in the object;

wrapping the encryption key using an identifier that identifies one or more devices including the electronic device; and embedded the encryption key wrapped by the identifier in the object, such that a decryption key corresponding to the encryption can only be recover subsequently using the identifier associated with the electronic device in order to decrypt the executable code image embedded therein.

* * * * *